(12) United States Patent
Taheri

(10) Patent No.: US 6,365,213 B1
(45) Date of Patent: Apr. 2, 2002

(54) METHOD AND COMBINATION FOR PRODUCING SUPPLEMENT-ENHANCED SOLID FOOD PRODUCT

(76) Inventor: Syde A. Taheri, 1275 Delaware Ave., Buffalo, NY (US) 14209

( * ) Notice: Subject to any disclaimer, the term of this patent is extended or adjusted under 35 U.S.C. 154(b) by 0 days.

(21) Appl. No.: 09/506,055

(22) Filed: Feb. 17, 2000

Related U.S. Application Data

(60) Provisional application No. 60/156,720, filed on Sep. 30, 1999.

(51) Int. Cl.[7] .............................................. A23L 1/217
(52) U.S. Cl. ........................ 426/302; 426/303; 426/520
(58) Field of Search ................................ 426/302, 282, 426/281, 283, 249, 250, 102, 94, 520

(56) References Cited

U.S. PATENT DOCUMENTS

| | | | |
|---|---|---|---|
| 4,877,626 A | * | 10/1989 | Ande et al. ................. 426/250 |
| 5,198,254 A | * | 3/1993 | Nisperos-Carriedo et al. ... 426/102 |
| 5,242,699 A | * | 9/1993 | Bednar et al. ............... 426/302 |
| 5,549,918 A | * | 8/1996 | Hartman et al. ............. 426/291 |
| 5,846,594 A | * | 12/1998 | Zimmerman et al. ........ 426/643 |
| 6,117,467 A | * | 9/2000 | Huling ........................ 426/281 |
| 6,132,785 A | * | 10/2000 | Collinge et al. ............. 426/302 |

* cited by examiner

*Primary Examiner*—Nina Bhat
(74) *Attorney, Agent, or Firm*—Walter W. Duft

(57) ABSTRACT

A method is disclosed for enhancing a solid food product with a supplement formulated to enhance the taste, color, nutritional value, vitamin content or medicinal properties of the food product. The food product, which could be a vegetable, fruit or bread product, is treated with a liquid food extract supplement using either a spraying device containing a supplement in liquid form, or by injection with a supplement following optional heating to soften the interior of the food product to a consistency that permits supplement injection and disbursal therein, or by immersing the food product in a supplement and applying pressure.

42 Claims, 5 Drawing Sheets

METHOD AND COMBINATION FOR PRODUCING SUPPLEMENT-ENHANCED SOLID FOOD PRODUCT

CROSS-REFERENCE TO RELATED APPLICATIONS

This application claims the benefit of U.S. Provisional Application No. 60/156,720, filed on Sep. 30, 1999.

STATEMENT REGARDING FEDERALLY SPONSORED RESEARCH OR DEVELOPMENT

Not Applicable

BACKGROUND OF THE INVENTION

1. Field of the Invention

This invention relates to food processing. More particularly, the invention concerns an apparatus and method for enhancing a solid food product with a supplement not ordinarily found in the food.

2. Description of the Prior Art

Out of the many foods that comprise the human diet, a few stand out as having nearly universal appeal. Perhaps foremost among these is the french fried potato, which is available virtually wherever prepared food is sold. Another widely popular food item is the bagel. This bread product is being increasingly consumed as people discover its tasty yet healthful non-fat properties.

With potatoes, bagels and other popular food items being consumed so avidly, it may be concluded that other foods which are necessary to a balanced diet are being neglected. Children are especially apt to prefer the starchy, nutrient deficient french fried potato over more nutritious foods, such as green vegetables. Adults may well favor bagels while tending to ignore other foods such as whole grain cereals, meats, eggs and dairy products.

It would be desirable if the mass consumer appeal of staple foods such as the potato or the bagel could be used as an avenue for delivering the nutrient value and vitamin content of other, less popular foods. It would be further desirable if the foregoing goal could be accomplished in a manner that tended to additionally enhance the popularity of the staple food. A related goal would be to use a popular food item as a mechanism for delivering vitamins or medicament to individuals who may be unwilling or unable to imbibe them by traditional means. To applicant's knowledge, the foregoing goals remain unsatisfied in the art.

SUMMARY OF THE INVENTION

The foregoing problems are solved and an advance in the art is obtained by a novel method and combination for enhancing a solid food product with a supplement formulated to enhance the taste, color, nutritional value, vitamin content or medicinal properties of the food product. In a first embodiment, the food product, which could be a vegetable or a fruit, is processed from a native configuration into a plurality of individual consumable units at a first processing location. The consumable units are optionally heated at a second processing location as necessary to prepare the consumable units for consumption. The consumable units are then conveyed on a conveyor to a third processing location where the conveyor is situated below a spraying device containing a supplement in liquid form. Here, the consumable units are spray-coated with the supplement. In a second embodiment, the food product, which could be a vegetable, a fruit, or a bread product, is injected with a supplement following optional heating to soften the interior thereof to a consistency that permits supplement injection and disbursal therein. In a third embodiment, a food product, such as a vegetable or a fruit, is entrained with a liquid supplement by optionally heating the food product to a consistency that permits supplement entrainment therein, immersing the food product in the supplement and applying pressure. In each of the embodiments, the supplement can be a nutrient-containing vegetable extract, a nutrient-containing meat extract, a vitamin, a medicament, or any other suitable composition.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
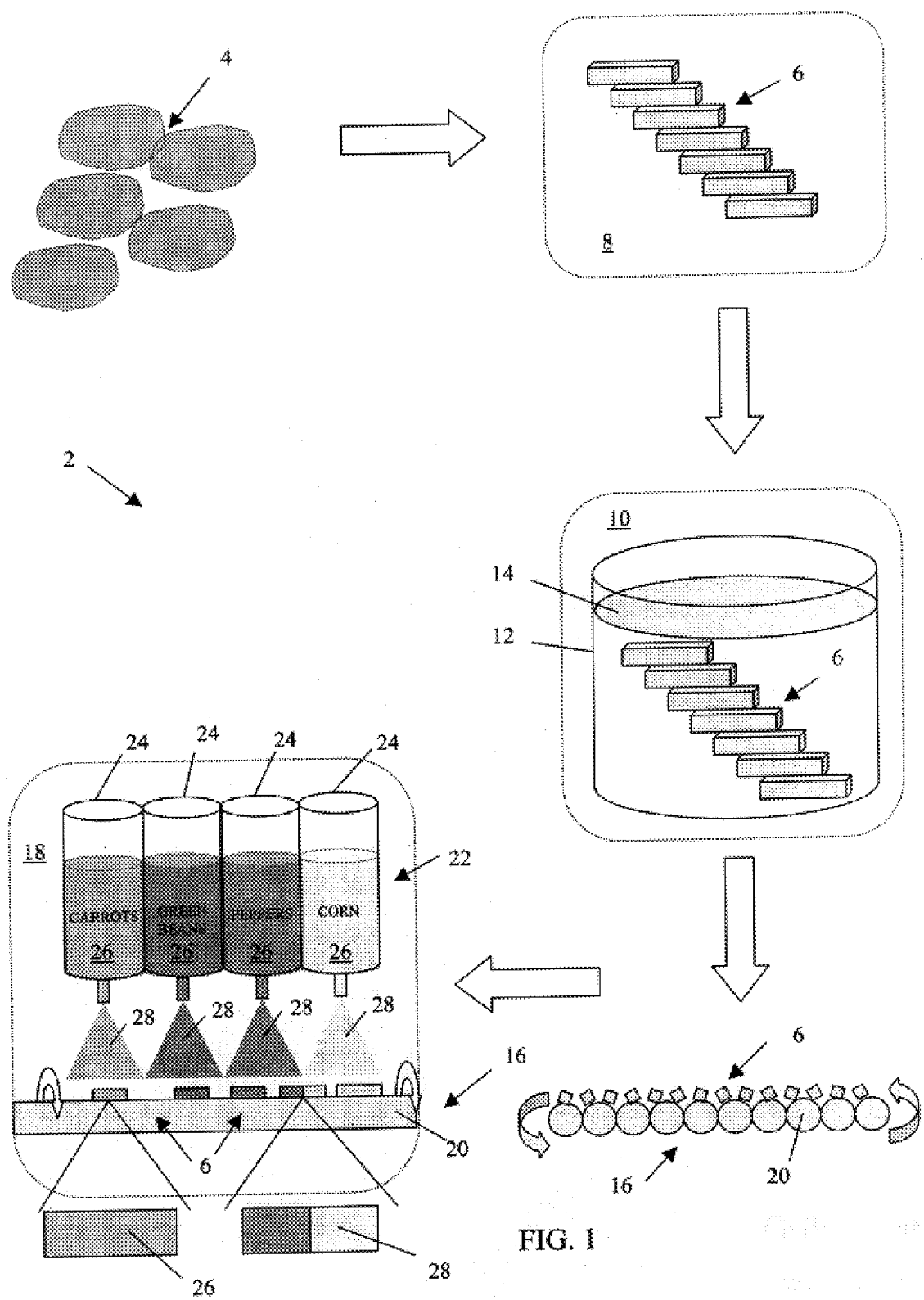
FIG. 1 is a functional block diagram showing a food processing combination configured in accordance with a first embodiment of the invention.

Turning now to the figures, wherein like reference numerals represent like elements in all of the several views, FIG. 1 shows a combination 2 in which a food product 4, which could comprise potatoes, tomatoes or any other suitable vegetable or fruit, is processed from a native configuration into a plurality of individual consumable units 6 at a first processing location 8. The processing performed at the first processing location 8 will normally depend on the product involved. For potatoes, the processing preferably includes feeding the potatoes through an automated potato slicer (not shown) configured to slice the potatoes into the shape and size of french fried potatoes, also known as "french fries."

Following processing at the first processing location 8, the consumable units 6 are conveyed to a second processing location 10 where they are optionally heated (e.g., if the food product 4 is a vegetable) as necessary to prepare them for consumption. This heating may be sufficient to achieve partial or even full cooking. For potatoes, full cooking is preferably performed using a metal frying receptacle 12, such as a deep fat fryer, containing a cooking oil 14, such as vegetable oil. More specifically, potato consumable units are preferably "flash fried" to convert them into fully cooked french fries.

Following optional heating at the second processing location 10, the consumable units 6 are placed on an automated conveyor 16 for conveyance to a third processing location 18. Although various conventional food conveyors may be used to implement the automated conveyor 16, it is preferred that this conveyor comprise multiple rotating rollers 20, made from stainless steel or the like, whose function is to roll the consumable units 6 as they are conveyed. This rolling operation is used to advantage at the third processing location 18, where processing is performed to coat a supplement onto the consumable units 6.

The automated conveyor 16 extends from the second processing location 10 to the third processing location 18, where it is situated below a spraying device 22. The spraying device 22 preferably includes one or more pressurized containers 24, each containing a liquid supplement 26 that is formulated to enhance the taste, color, nutritional value or medicinal properties of the consumable units. Here, the consumable units are spray-coated with the liquid supplement, which is emitted as a spray 28 from each container 24.

As shown in FIG. 1, the spraying device 22 preferably includes plural containers 24, each containing a different liquid supplement. The choice of supplement depends on the application, i.e., whether an enhancement of taste, color, nutritional value, vitamin content or medicinal value is desired in the food product to be treated. In one aspect of the invention, the supplement can be a nutrient-containing vegetable extract. Other supplements that could be used to coat the consumable units 6 are nutrient-containing meat extracts and medicaments. Also, if the food product 4 is a fruit, a nutrient-containing fruit extract could be applied as the supplement.

FIG. 1 illustrates an implementation of the invention wherein the containers 24 are filled with nutrient-containing vegetable extracts, namely (from the left-hand side of FIG. 1) extracts of carrots, green beans, peppers and corn. These can be easily produced by pulverizing the vegetables to be used and extracting a juice or liquefied pulp therefrom. When sprayed onto the consumable units 6 as a liquid coating, these vegetable extracts will alter the color, taste, nutrient value and vitamin content of each unit. Thus, consumable units that are sprayed with carrot extract would tend to have an orange color and a carrot-like taste, and would provide the nutrients and vitamins found in carrots. Consumable units that are sprayed with green bean extract would tend to have a green color and a bean-like taste, and would provide the nutrients and vitamins found in green beans. Consumable units that are sprayed with pepper extract would tend to have a red, green or yellow color (depending on the pepper variety) and a spicy pepper-like taste, and would provide the nutrients and vitamins found in peppers. Consumable units that are sprayed with corn extract would tend to have a yellow color and a corn-like taste, and would provide the nutrients and vitamins found in corn.

Depending on the size and positioning of the containers 24, the manner in which the containers dispense their spray, and the positioning of the consumable units 6 on the conveyor 16, each consumable portion may be coated with the spray from a single container 24, producing a single color as shown at 26, or the spray from multiple containers 24, producing multiple colors as shown at 28. Note that the entire surface of each consumable portion will advantageously be coated as a result of the rolling action of the rollers 20.

It will be appreciated that the addition of taste and color enhancement to the food product 4 in the manner shown in FIG. 1 can greatly increase its consumer appeal. Moreover, even without taste or color enhancement, the popularity of the food product 4 itself can make it an excellent vehicle for delivering important nutrients, vitamins and/or medicament to individuals who require (or can benefit from) these substances.

Figure 2:
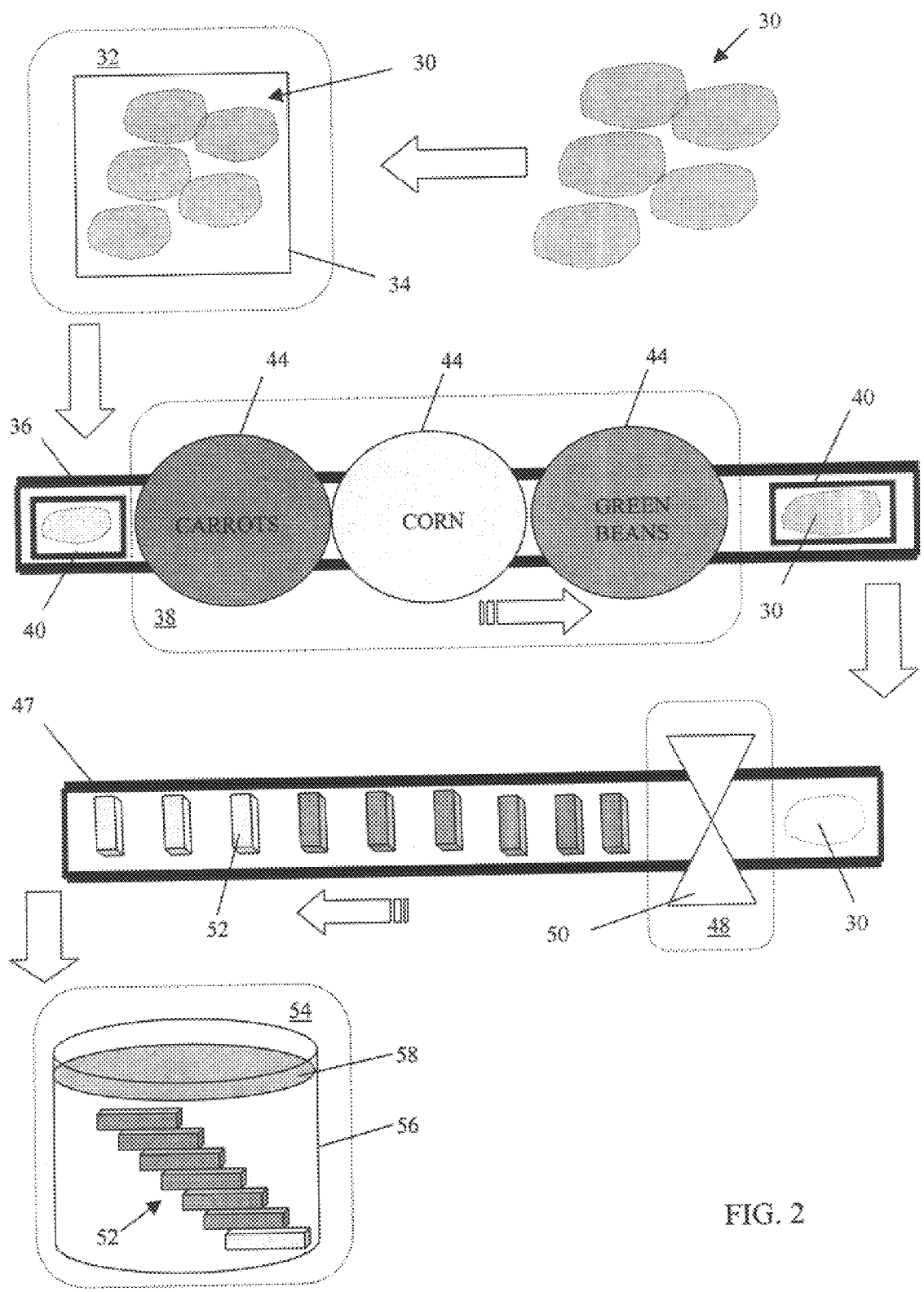
FIG. 2 is a functional block diagram showing a food processing combination in accordance with a second embodiment of the invention.
Figure 3:
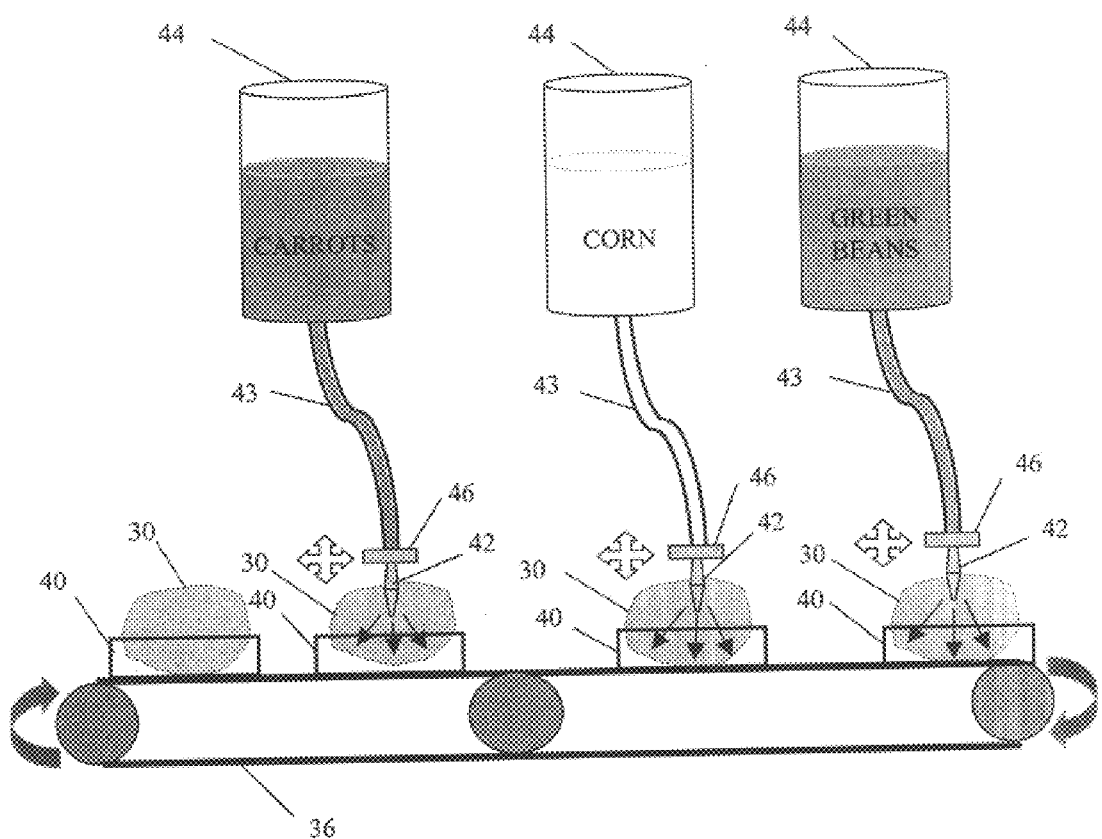
FIG. 3 is a side elevational perspective view of a conveyor system and three supplement-injecting devices of the food processing combination of FIG. 2.

Turning now to FIGS. 2–3, an alternative embodiment of the invention is shown in which a supplement (such as any of those described above relative to FIG. 1) is injected into a food product 30. The food product 30 could be a potato, a tomato, a bagel or any other suitable vegetable, fruit, or bread product. FIGS. 2–3 show the food product 30 (embodied as a vegetable such as a potato) being injected with several vegetable extracts, namely, extracts of carrots, corn and green beans. The first step in the process of FIGS. 2–3 is to optionally heat the food product 4 as necessary at a first processing location 32 until the food product 30 has a consistency that allows a supplement to be injected and disbursed therein. For potatoes or other vegetables, the food product may be flash steamed in a microwave oven 34, or it could be water boiled in a cooking receptacle (not shown). For example, if microwave heating of potatoes is performed, heating a single potato for two minutes at a normal power setting should be sufficient to suitably soften the potato. For fruits and breads, no heating may be required if the consistency of the food product is such that a supplement will already readily disburse therethrough.

Following the optional heating at the first processing location 32, the food product 30 is placed on an automated conveyor 36 for transport to a second processing location 38. The conveyor 36 can be any conventional food processing conveyor, but preferably includes individual cradles 40 designed to retain a single food product unit, such as a single potato or bagel. As the food product 30 arrives at the second processing location 38, it passes under injection nozzles 42 (three are shown in FIG. 3) that are spaced longitudinally along the conveyor in the direction of conveyor movement. Each nozzle 42 is in fluid communication via a flexible fluid transfer tube 43 with a source of pressurized supplement, such as a container 44. Each nozzle 42 can be mounted on an individual movable carriage 46, or alternatively, all of the nozzles could mount to a single movable carriage (not shown). Each nozzle 42 injects one food product unit at a time, but the injections by each nozzle preferably take place in parallel, with all nozzles injecting simultaneously into their respective food product units. A conventional programmable control system may be programmed to manipulate the carriages 46 in synchronization with each new group of food product units conveyed beneath the nozzles 42 by the cradles 40. As each such food product group passes under the nozzles 42, the nozzles operate according to an injection cycle in which they (1) extend downwardly to impale a food product unit, (2) inject supplement under pressure into the food product unit until the supplement is disbursed throughout a substantial portion thereof, and (3) retract upwardly to release the food product unit. To accommodate lateral movement of the food product unit during the injection and disbursement portion of the injection cycle, the carriages 46 preferably have the ability to move horizontally as well as vertically, as shown by the arrows labeled "A" in FIG. 3.

Following injection of the supplement, a second conveyor 47 (see FIG. 2) may be used to convey the injected food product 30 to an third processing location 48, where optional slicing occurs. More particularly, an automated slicer 50 can be used to slice each food product 30 into consumable units 52 having a desired shape. For example, if the food product 30 consists of potatoes, the consumable units 52 are preferably shaped as french fries. The consumable units 52 (or the unsliced food product 30) may then be optionally cooked at a fourth processing location to the extent that cooking is required (e.g., if the food product is a vegetable). For potatoes, the consumable units 52 are preferably cooked in a frying receptacle 56, such as a deep fat fryer, containing a cooking oil 58, such as vegetable oil. More specifically, the consumable units 52 are preferably "flash fried" to convert them into fully cooked french fries.

As in the case of the embodiment of FIG. 1, it will be appreciated that the addition of taste and color enhancement to the food product 30 in the manner shown in FIGS. 2–3 can greatly increase its consumer appeal. Again, moreover, even without taste or color enhancement, the popularity of the enhanced food product itself can make it an excellent vehicle for delivering important nutrients, vitamins and/or medicament to individuals who stand to benefit from these substances.

Figure 4:
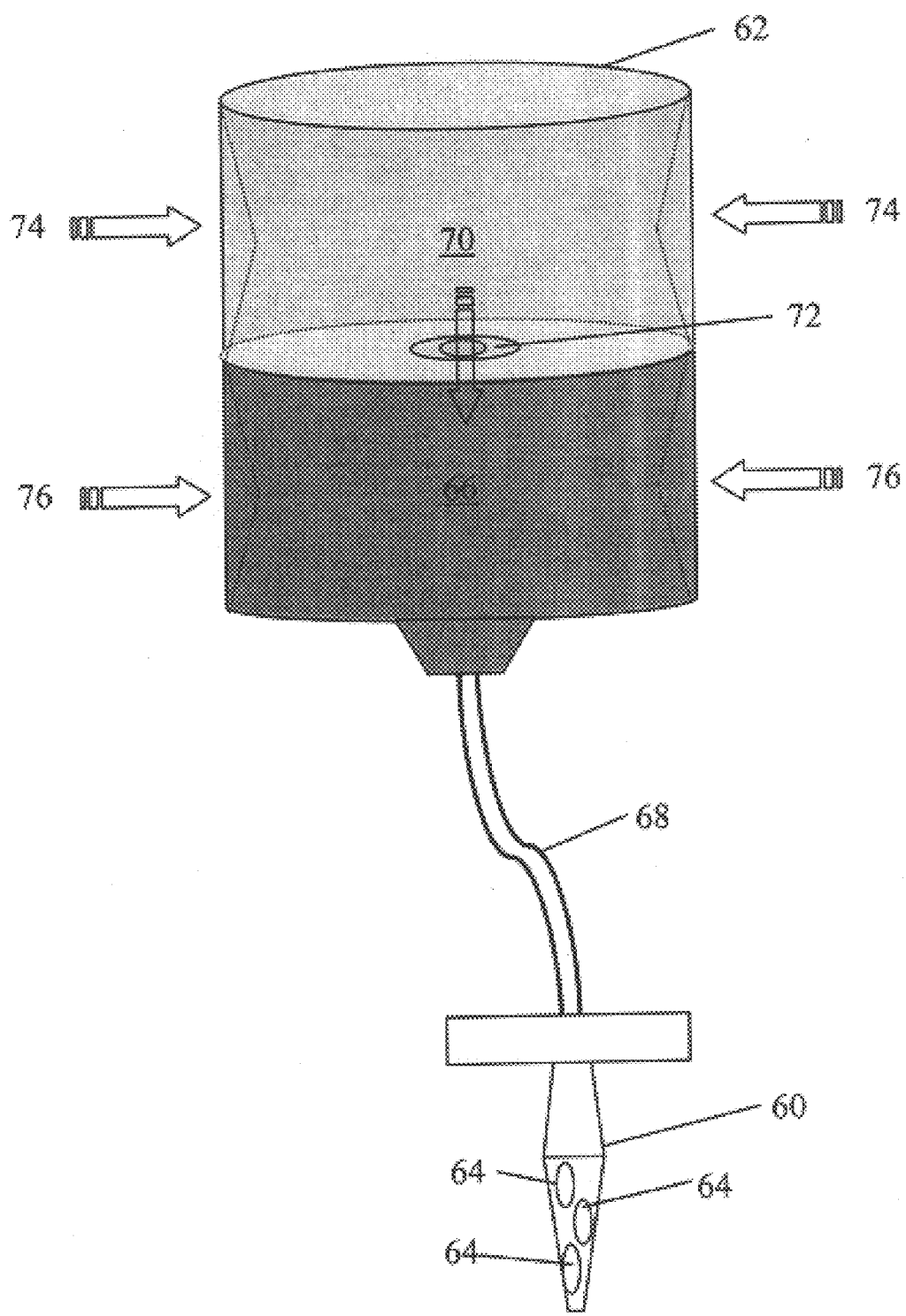
FIG. 4 is a side elevational perspective view of an injection nozzle and supplement container for alternative use in the food processing combination of FIG. 2.

Turning now to FIG. 4, a refinement of the forgoing injection scheme includes the use of a multi-port injection nozzle 60 and a two-chamber flexible container 62. The injection nozzle 60 includes at least two opposing injection ports 64 that help deliver supplement into a food product, such as a bagel 61, in several directions. This makes it easier for the supplement to disburse through the food product. The container 62 includes a first chamber 66 in fluid communication with the injection nozzle 60 via tubing 68. The first chamber 66 contains a supplement in paste form, such as a vegetable extract paste. A second chamber 70 is in fluid communication with the first chamber 66. It contains a liquid such as water or vegetable juice. A one-way valve 72 separates the first and second chambers 66 and 70 and provides the fluid communication pathway between the chambers. Prior to transferring the supplement from the first chamber 66 to the nozzle 60 for injection, the supplement is preferably diluted by mixing it with liquid from the second chamber 70. This can be done by applying a squeezing force to opposing sides of the second chamber 70 (as shown at 74), which forces the liquid from the second chamber through the valve 72 and into the first chamber 66. To inject the diluted supplement from the nozzle 60, a squeezing force may be applied to opposing sides of the first chamber 66 (as shown at 76). Should the supplement in the first chamber 66 begin to dry out during injection operations, it can be rehydrated by again squeezing the second chamber 70. Note that the container 62 and the nozzle 60 may be particularly useful for enhancing a bread product, such as a bagel, with a supplement.

Figure 5:
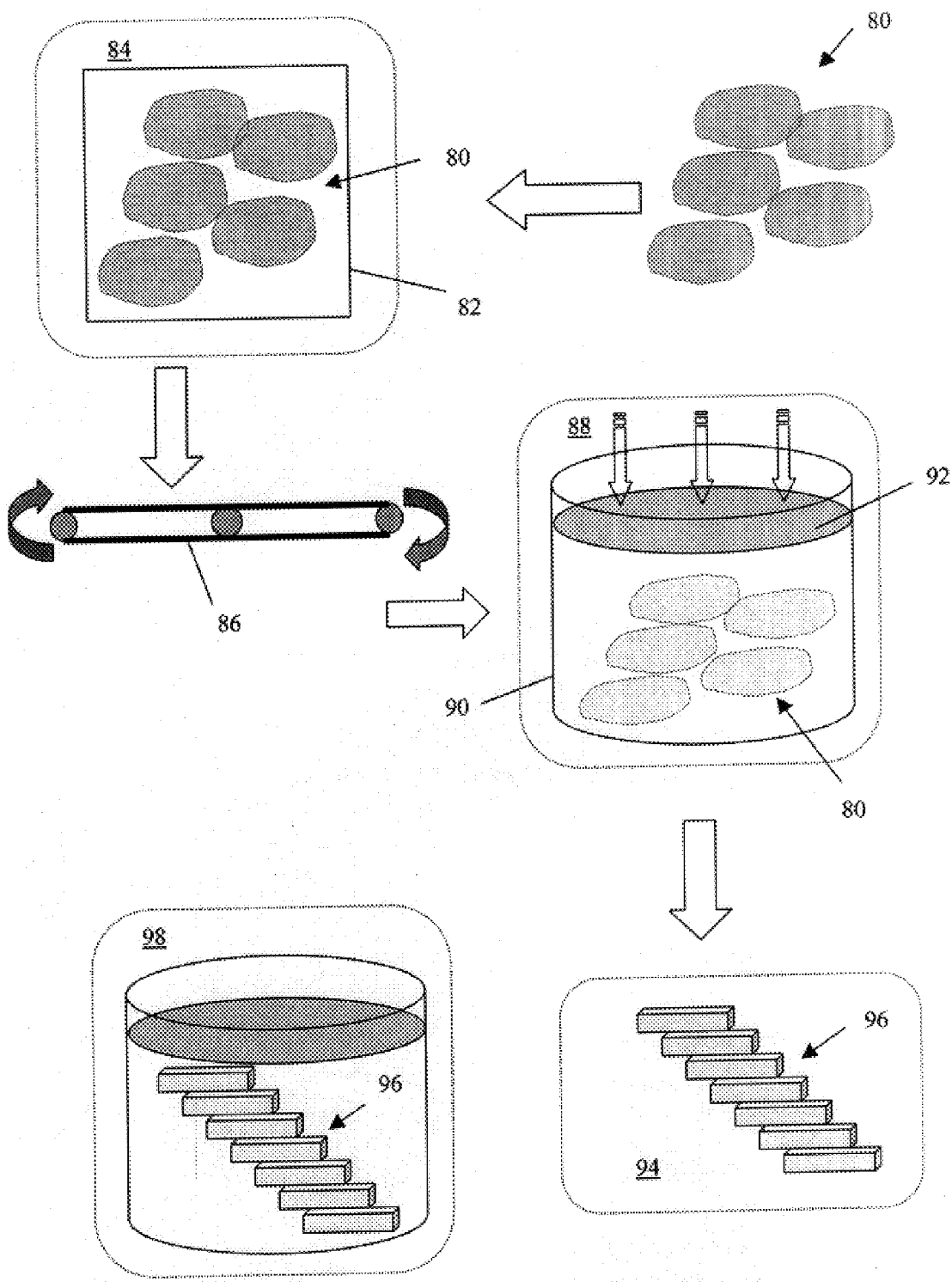
FIG. 5 is a functional block diagram showing a food processing combination in accordance with a third embodiment of the invention.

Turning now to FIG. 5, another embodiment of the invention is shown in which a food product 80, which could be a potato, a tomato or any other suitable vegetable or a fruit, is entrained with a supplement by immersing the food product in the supplement and applying pressure. The food product 80 is first optionally heated in a heating device 82 at a first processing location 84 until the interior thereof is soft enough to allow entrainment of a supplement therein. The food product is then placed on a conveyor 86 for automated transport to a second processing location 88 that includes a container 90. The container 90 contains a supplement 92 formulated to enhance the taste, color, nutritional value, vitamin content or medicinal properties of the food product. The food product 80 is immersed in the supplement, following which the container 90 is sealed and positively pressurized for a sufficient amount of time to entrain the supplement into the food product. Thereafter, the food product 80 may be optionally sliced (e.g., if it is a vegetable) at a third processing location 94 into consumable units 96. The consumable units 96 (or the unsliced food product 80) may then be optionally cooked at a fourth processing location 98 to the extent that cooking is required (e.g., if the food product 80 is a vegetable).

As in the case of the embodiments of FIGS. 1 and 2–3, it will be appreciated that the addition of taste and color enhancement to the food product 80 in the manner shown in FIG. 5 can greatly increase its consumer appeal. Again, moreover, even without taste or color enhancement, the popularity of the enhanced food product itself can make it an excellent vehicle for delivering important nutrients, vitamins and/or medicament to individuals who stand to benefit from these substances.

Accordingly, a novel method and combination are disclosed for enhancing a solid food product with a supplement. While various embodiments of the invention have been disclosed, it will be appreciated that many variations and alternative embodiments can be implemented in accordance with the invention. It is understood, therefore, that the invention is not to be in any way limited except in accordance with the spirit of the appended claims and their equivalents.

What is claimed is:

1. A method for enhancing a solid vegetable, fruit or bread food product with a supplement, comprising the steps of:
   optionally heating the food product as necessary to achieve at least partial cooking at a first processing location;
   automatically conveying the food product from said first processing location to a second processing location that includes a container containing a liquid vegetable, fruit or meat extract supplement formulated to enhance the taste, color, nutritional value, vitamin content or medicinal properties of the food product; and
   applying said supplement to the food product at said second processing location.

2. A method in accordance with claim 1 further including dividing the food product into plural individual consumable units prior to said heating step.

3. A method in accordance with claim 2 wherein said heating step includes frying said consumable units.

4. A method in accordance with claim 3 wherein said heating step includes flash frying said consumable units in a frying receptacle containing a cooking oil.

5. A method in accordance with claim 4 wherein said supplement applying step includes spraying said supplement from said container in liquid form onto said consumable units.

6. A method in accordance with claim 5 wherein said container comprises plural containers containing different supplements and said spraying step includes spraying different ones of said supplements in liquid form onto different ones of said consumable units.

7. A method in accordance with claim 5 wherein said container comprises plural containers containing different supplements and said spraying step includes spraying different ones of said supplements in liquid form onto a single one of said consumable units.

8. A method in accordance with claim 1 wherein said supplement applying step includes injecting said supplement from said container in liquid form into the food product.

9. A method in accordance with claim 8 further including dividing the food product into individual consumable units following said supplement applying step.

10. A method in accordance with claim 9 further including frying said consumable units following said dividing step.

11. A method in accordance with claim 8 wherein said supplement applying step includes using an injection nozzle having plural opposing injection ports.

12. A method in accordance with claim 8 wherein said container includes a first chamber in fluid communication with an injection nozzle and containing said supplement in paste form and a second chamber in fluid communication with said first chamber and containing a liquid, and wherein said supplement in paste form is mixed with said liquid prior to said supplement applying step.

13. A method in accordance with claim 12 wherein said first chamber and said second chamber are separated by a valve and said mixing step includes forcing said liquid from said second chamber into said first chamber.

14. A method in accordance with claim 12 wherein said liquid is a vegetable or fruit juice.

15. A method in accordance with claim 1 wherein said supplement applying step includes placing the food product in said container, with said supplement contained therein being in liquid form, and applying a positive pressure to entrain said supplement into the food product.

16. A method in accordance with claim 1 wherein said supplement is a nutrient-containing vegetable extract.

17. A method in accordance with claim 16 wherein said vegetable extract is colored so as to change the color of the food product when applied thereto.

18. A method in accordance with claim 16 wherein said vegetable extract is flavored so as to change the taste of the food product when applied thereto.

19. A method in accordance with claim 1 wherein said supplement is a nutrient-containing meat extract.

20. A method in accordance with claim 1 wherein said supplement is a medicament.

21. A method for enhancing a solid vegetable or fruit product with a supplement, comprising the steps of:

processing the product from a native configuration into a plurality of individual consumable units at a first processing location;

optionally heating said consumable units at a second processing location as necessary to prepare said consumable units for consumption;

conveying said consumable units on a conveyor from said second processing location to a third processing location wherein said conveyor is situated below a spraying device containing a liquid vegetable, fruit or meat extract supplement formulated to enhance the taste, color, nutritional value or medicinal properties of said consumable units; and spray coating said consumable units with said liquid supplement at said third processing location.

22. A method in accordance with claim 21 wherein said spraying device includes plural containers containing different liquid supplements.

23. A method in accordance with claim 22 wherein said liquid supplements are nutrient-containing vegetable extracts.

24. A method in accordance with claim 23 wherein said vegetable extracts are colored so as to change the color of said consumable units when spray coated thereon.

25. A method in accordance with claim 23 wherein said vegetable extracts are flavored so as to change the taste of said consumable units when spray coated thereon.

26. A method in accordance with claim 21 wherein said liquid supplement is a nutrient-containing meat extract.

27. A method in accordance with claim 21 wherein said liquid supplement is a medicament.

28. A method for enhancing a solid vegetable, fruit or bread product with a supplement, comprising the steps of:

optionally heating the product as necessary until it has a consistency which is sufficient to that allow a supplement to be disbursed therein;

actively injecting a food extract supplement into said food product, said supplement being formulated to enhance the taste, color, nutritional value or medicinal properties of the food product; and dispersing said supplement throughout a substantial portion of the product.

29. A method in accordance with claim 28 wherein said injection and dispersing steps include injecting said supplement into the product using an injection nozzle in fluid communication with a source of pressurized supplement, said injecting continuing until said dispersing step is completed.

30. A method in accordance with claim 29 wherein said source of pressurized supplement is a flexible container having a first chamber in fluid communication with said nozzle containing said supplement in paste form, and a second chamber in fluid communication with said first chamber and containing a liquid for hydrating said supplement.

31. A method in accordance with claim 30 wherein said flexible container includes a pressure-activated valve between said first chamber and said second chamber, and wherein said method further includes squeezing said second chamber of said flexible container to hydrate said supplement as necessary.

32. A method in accordance with claim 28 wherein said supplement is a nutrient-containing vegetable extract.

33. A method in accordance with claim 32 wherein said vegetable extract is colored so as to change the color of the product when injected therein.

34. A method in accordance with claim 32 wherein said vegetable extract is flavored so as to change the taste of the product when injected therein.

35. A method in accordance with claim 28 wherein said supplement is a nutrient-containing meat extract.

36. A method in accordance with claim 28 wherein said supplement is a medicament.

37. A method for enhancing a solid vegetable or fruit product with a supplement, comprising the steps of:

optionally heating the product as necessary until it has a consistency which is sufficient to allow a supplement to be entrained therein;

placing said product in a container containing a supplement that is formulated to enhance the taste, color, nutritional value or medicinal properties of the product; and applying pressure to entrain said supplement into said food product.

38. A method in accordance with claim 37 wherein said supplement is a nutrient-containing vegetable extract.

39. A method in accordance with claim 38 wherein said vegetable extract is colored so as to change the color of the product when entrained therein.

40. A method in accordance with claim 38 wherein said vegetable extract is flavored so as to change the taste of the product when entrained therein.

41. A method in accordance with claim 37 wherein said supplement is a nutrient-containing meat extract.

42. A method in accordance with claim 37 wherein said supplement is a medicament.

* * * * *